Figure 1:
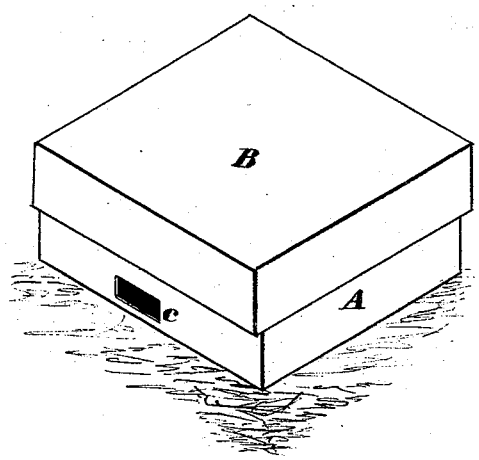
Figure 2:
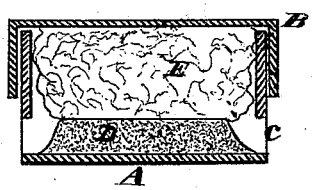

M. BARTHEL.
ANT EXTERMINATOR.

No. 170,505. Patented Nov. 30, 1875.

Witnesses
Geo. H. Strong.
C. M. Richardson

Inventor
Michael Barthel
By his Atty's
Dewey & Co.

UNITED STATES PATENT OFFICE.

MICHAEL BARTHEL, OF MILPITAS, CALIFORNIA.

IMPROVEMENT IN ANT-EXTERMINATORS.

Specification forming part of Letters Patent No. 170,505, dated November 30, 1875; application filed June 12, 1875.

*To all whom it may concern:*

Be it known that I, MICHAEL BARTHEL, of Milpitas, Santa Clara county, State of California, have invented an Improved Ant-Exterminator; and I do hereby declare the following description and accompanying drawings are sufficient to enable any person skilled in the art or science to which it most nearly appertains to make and use my said invention or improvement without further invention or experiment.

The object of my invention is to provide a box or case in which any compound or substance for poisoning ants can be kept in a properly moist condition to permit the ants to feed from it, and which is provided with suitable openings to admit the ants to the interior of the box, so that they can feed upon the contained substance or compound.

Referring to the drawings accompanying this specification and forming a part of the same, let A represent a box, which may be made of tin or other suitable material, and which has a cover or top, B. In one or more of the sides of this box I make an opening, c, near the bottom, through which the ants can pass into the interior of the box. The poisonous substance or compound D, which it is intended for the ants to feed upon, is placed inside of this box, and the box is placed in the path of the ants, or where they can readily get at it. They will then enter the box and feed upon the substance or compound, and thus be destroyed. The compound which I use is composed of sugar and cobalt. These substances I mix together in the proper proportions, and place the mixture in the bottom of the box. I then place a piece of sponge, cotton, or other absorbent material, E, (which has been saturated with water,) upon the mixture inside of the box and cover it over. The wet sponge or other absorbent will keep the mixture moistened and soft, so that the ants can eat it.

When the poisonous substance or compound is soft the absorbent material need not be used.

By this means I can terminate any ordinary invasion of ants in a short time.

Having thus described my invention, what I claim, and desire to secure by Letters Patent, is—

In combination with the box A, with its openings c, arranged to contain a poisonous compound, the absorbent material E, substantially as and for the purpose specified.

MICHAEL BARTHEL.

Witnesses:
J. R. WELLER,
A. JONES.